United States Patent
Nardella

[15] 3,635,145
[45] Jan. 18, 1971

[54] FRUIT PRESS AND FERMENTATION TANK

[72] Inventor: Joseph A. Nardella, 1500 "T" Street, Sacramento, Calif. 95814

[22] Filed: July 2, 1970

[21] Appl. No.: 52,040

Related U.S. Application Data

[63] Continuation-in-part of Ser. No. 768,030, Oct. 16, 1968, abandoned.

[52] U.S. Cl. ............................................99/277.1, 100/143
[51] Int. Cl. .......................................................C12h 1/22
[58] Field of Search ....................99/277.2, 277.1, 277, 276, 99/275, 48, 52; 100/143

[56] References Cited

UNITED STATES PATENTS

| 734,774 | 7/1903 | Szafka | 100/143 |
| 1,412,029 | 4/1922 | Galdi | 100/143 |
| 1,915,187 | 6/1933 | Hawkins | 99/277.2 X |
| 1,919,815 | 7/1933 | Villano | 100/143 |

*Primary Examiner*—Robert W. Jenkins
*Attorney*—Bruce & McCoy

[57] ABSTRACT

A vertical open framework having a base, transversely surrounds and supports a tank. A fruit pulp removal frame disposed in the tank bottom permits draining off the fruit juice through a drain spout and easy removal of the crushed fruit pulp.

6 Claims, 7 Drawing Figures

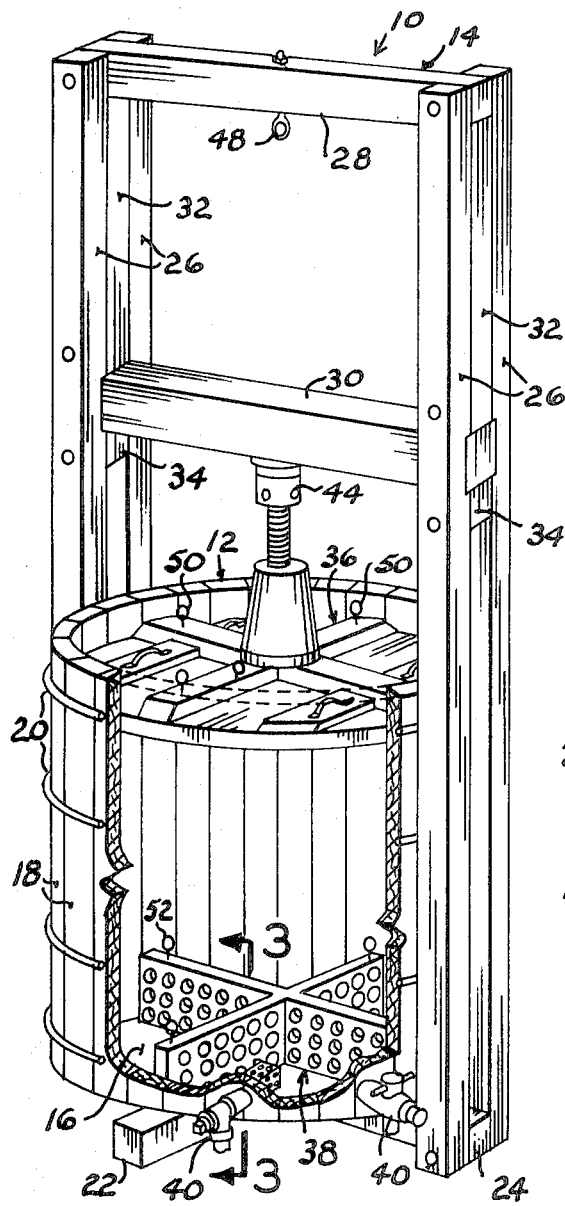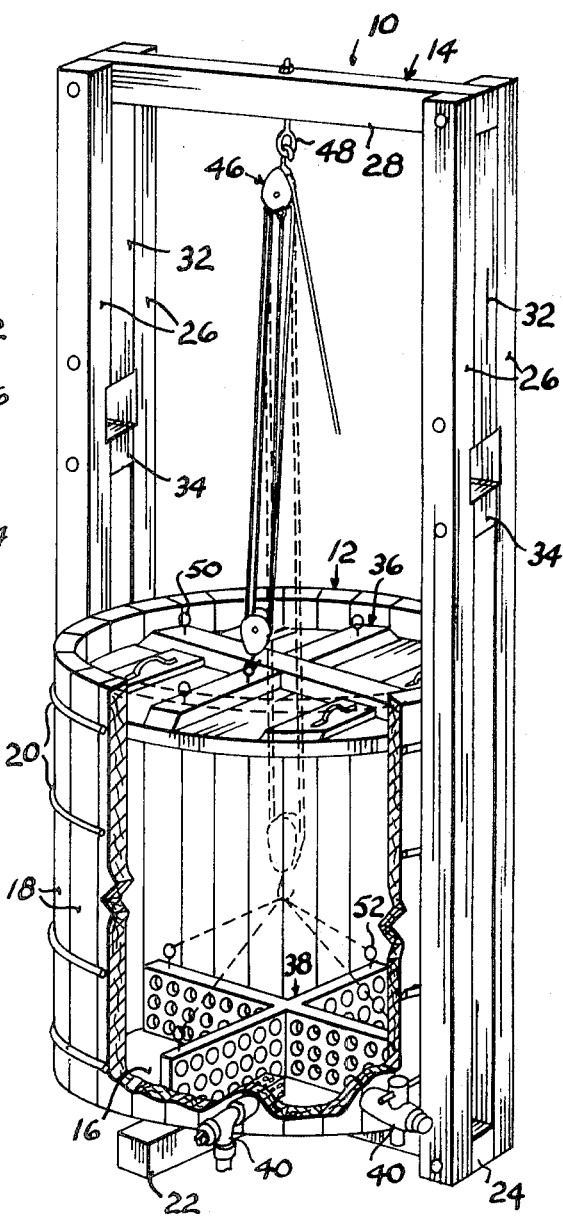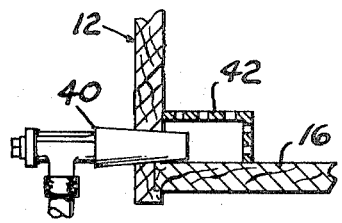
FIG. 1
FIG. 2
FIG. 3
JOSEPH A. NARDELLA
INVENTOR.
BY
Robert K. Rhea
AGENT INVENTOR
JOSEPH A. NARDELLA
BY Bruce & Meloy
ATTORNEY

FRUIT PRESS AND FERMENTATION TANK

This application is a continuation-in-part of my application Ser. No. 768,030, filed Oct. 16, 1968, now abandoned.

BACKGROUND OF THE INVENTION

The present invention relates to wine making and more particularly to a fruit press and fermentation tank.

In processing fruit, to extract the juice therefrom, such as obtaining grape juice from grapes to form wine, it is necessary that some means be provided for containing the bulk of the grapes necessary to produce a given quantity of grape juice or wine. Furthermore, it is preferable that the grapes, after being crushed and placed within a container, be maintained in a compacted state to ensure the extraction of all juices contained within the skin of the grape. After fermentation, the crushed pulp must be dug out of the tank bottom.

This invention provides a means for maintaining the crushed grapes under pressure during fermentation and a means for removing the compacted pulp after drawing off the liquid.

SUMMARY OF THE INVENTION

A generally cylindrical upwardly open tank is supported by a base connected with an open framework projecting upwardly above the tank forming a fixed fruit receiving container. A vertically movable element comprising a disklike lid overlies the crushed fruit and is forced downwardly thereagainst by a jack interposed between the lid and a cross brace of the frame. A gridlike support within the tank divides the resultant fruit pulp or residue for removal from the tank by means of a frame which is lifted from the tank by block and tackle which also lifts the lid. A drain spout, connected with the bottom wall portion of the tank, removes fruit juice therefrom.

The principal object of this invention is to provide a means for containing, compacting and removing fruit pulp after extracting the juice therefrom during and after fermentation.

DESCRIPTION OF THE DRAWINGS

FIG. 1 is a perspective view, with parts broken away and sectioned for clarity, of the device in operative position;

FIG. 2 is a view similar to FIG. 1 illustrating, by solid and dotted lines, the manner of removing the lid and fruit pulp residue;

FIG. 3 is a vertical cross-sectional view taken substantially along the line 3—3 of FIG. 1;

DESCRIPTION OF THE PREFERRED EMBODIMENT

Figure 4:
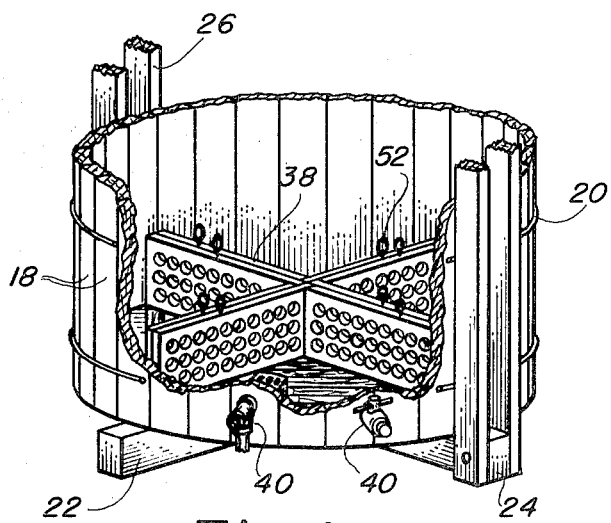
FIG. 4 is a perspective view partially broken away showing the fruit pulp removal frame.

Like characters of reference designate like parts in those figures of the drawings in which they occur.

In the drawings:

The reference numeral 10 indicates the device, as a whole, comprising a tank 12 and a frame 14. The tank 12 is upwardly open and generally cylindrical barrellike in overall configuration and appearance having a bottom 16 joined to the inner surface of a plurality of upstanding juxtaposed staves 18 surrounded by a plurality of vertically spaced rings 20. The bottom of the tank 12 is supported by a pair of crossed frame members 22 and 24. The member 24 is connected at its respective ends between pairs of upstanding standards or posts 26 which project upwardly above the tank a distance substantially twice its height. The upper end portion of the pairs of posts 26 are interconnected by a top brace 28. A jack brace or support 30 slidably extends transversely between the pairs of posts 26 in spaced relation below the top brace 28 and above the tank 12.

A filler block 32 is interposed between the respective pairs of posts 26 below the top brace 28 and above the jack brace 30 which prevents movement of the jack brace 30 toward the top brace 28. A stop 34 is similarly interposed between the respective pairs of posts 26 below the jack brace 30.

A reinforced generally circular lid 36 is vertically slidably received coaxially by the inner surface of the tank 12. The upper surface of the tank bottomly supports a fruit pulp removal frame which is formed from a pair of crossed dividers or stringers 38 comprising relatively thin, vertically disposed edgewise, members each having a plurality of transverse apertures for permitting fruit juice flow therethrough.

Figure 6:
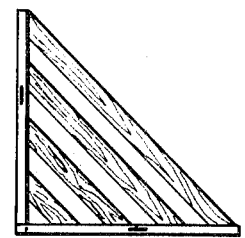
FIG. 6 is a plan view of the removed section of the fruit pulp removal frame.
Figure 5:
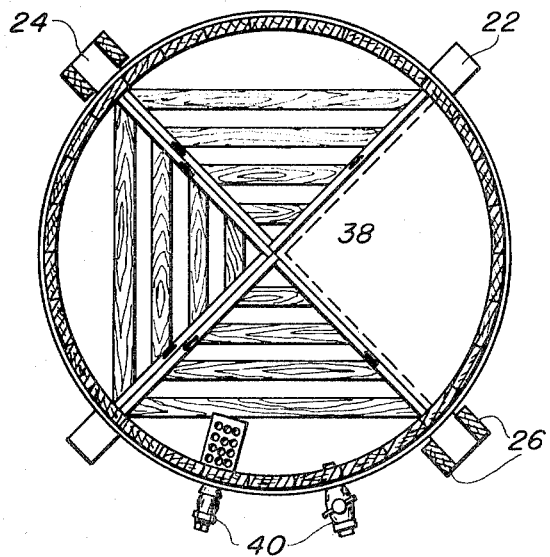
FIG. 5 is a plan view in partial section at the middle of the tank showing one of the quarter sections of the fruit pulp removal frame removed.
Figure 7:
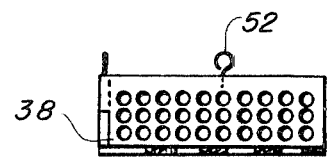
FIG. 7 is a side elevation of the removed section of the fruit pulp removal frame.

Easier removal of the frame from the tank can be effected by constructing it in quarter sections as shown in FIGS. 4–7. When the whole frame is removed from the tank, the friction or drag of the fruit pulp on the sides of the tank necessitates a very large lifting force.

The bottom portion of the tank 12 is further provided with one or more drain spouts 40 extending through the wall of the tank for communication with the interior thereof. The inward end of each drain is shielded or protected by a foraminated strainer 42 which facilitates removal of the fruit juice.

OPERATION

In operation a quantity of grapes, or other fruit if desired, not shown, are crushed and placed within the tank 12 with the dividers 38 in place and the drain spouts 40 closed. The lid is positioned within the tank over the top of the crushed grapes and the jack brace 30 is inserted within the frame 14. A jack, such as a screw-type jack 44, is interposed between the upper surface of the lid 36 and jack brace 30. The jack 44 is extended to force the lid against the crushed grapes. The grapes are maintained under pressure for a selected length of time within the tank until the fermentation period of the grape juice has passed. The resulting wine is then drained out through the spouts 40. The pulp and other grape residue is further pressed or compacted and removed from the tank for disposal. This is accomplished by removing the jack 44 and jack brace 30 and then connecting one end of a small tackle block 46 to an eyebolt 48 secured to the top brace 28 and connecting the other end of the tackle block 46 to one or more eyelets 50 secured to the upper surface of the lid 36. After the lid has been removed the tackle block is connected with eyelets 52 connected to the removal frame 38 which lifts the pressed grapes residue, not shown, out of the tank for its disposal and eliminates the messy job of digging the pulp out by hand. This completes one cycle of operation.

I claim:

1. In a fruit press including an upright open tank having a bottom, a vertical inner wall surface, a horizontally disposed lid closely received slidably by said inner wall surface, and means associated with said tank forcibly lowering and lifting said lid, a fruit pulp removal frame comprising crossed dividers extending transversely across the bottom of said tank, said dividers comprising a pair of relatively thin members vertically disposed edgewise and each having a plurality of transverse apertures, said frame being vertically removable from said tank.

2. The fruit pulp removal frame of Claim 1 wherein said crossed dividers are constructed as individually removable quarter sections.

3. A fruit press, comprising an upright open tank having a bottom and having a vertical inner wall surface; a horizontally disposed lid closely received slidably by said inner wall surface; means associated with said tank forcibly lowering and lifting said lid; a fruit pulp removal frame having crossed dividers extending transversely across the bottom of said tank, said dividers being a pair of relatively thin members vertically disposed edgewise and each having a plurality of transverse apertures; an open frame transversely surrounding said tank and projecting thereabove said frame having at least one horizontal cross brace in parallel-spaced relation with respect to the top of said tank; and jack means interposable between said cross brace and said lid, and block and tackle means extendable between and connectable with said cross brace and said lid.

4. The fruit pulp removal frame of claim 3 wherein said crossed dividers are constructed as individually removable quarter sections.

5. A fruit press, comprising an upright open tank having a bottom and having a vertical inner wall surface; a horizontally disposed lid closely received slidably by said inner wall surface; means associated with said tank forcibly lowering and lifting said lid; a fruit pulp removal frame having crossed dividers extending transversely across the bottom of said tank, said dividers being constructed as individually removable quarter sections having relatively thin members vertically disposed edgewise and each having a plurality of transverse apertures; an open frame transversely surrounding said tank and projecting thereabove, said frame having a first lower removable horizontal cross brace and a second higher fixed horizontal cross brace, said braces disposed in parallel spaced relation with respect to the top of said tank; jack means interposable between said first cross brace and said lid, and block and tackle means extendable between and connectable with said second cross brace and said lid when said first cross brace is removed.

6. The structure as specified in claim 5 and further including a drain spout extending through the wall of said tank adjacent said bottom; and a foraminated strainer surrounding the inward end portion of said spout.

* * * * *